United States Patent
Shibuya

[11] Patent Number: 6,164,710
[45] Date of Patent: Dec. 26, 2000

[54] DOG WASTE RECEPTACLE AND DISPOSAL DEVICE

[76] Inventor: Koji Shibuya, 3-6-10 Seko Fujieda, Shizuoka, Japan

[21] Appl. No.: 09/338,792

[22] Filed: Jun. 23, 1999

[51] Int. Cl.[7] .................................................. A01K 29/00
[52] U.S. Cl. ........................................... 294/1.5; 15/257.3
[58] Field of Search ............................ 294/1.3–1.5, 19.1, 294/55; 15/104.8, 257.1, 257.3, 257.6, 257.8

[56] References Cited

U.S. PATENT DOCUMENTS

| | | | |
|---|---|---|---|
| 162,524 | 4/1875 | Bliss ........................................ | 15/257.8 |
| D. 386,840 | 11/1997 | Sturm . | |
| 689,156 | 12/1901 | Benham ................................. | 15/257.3 |
| 4,042,269 | 8/1977 | Skermetta ................................ | 294/1.5 |
| 4,102,547 | 7/1978 | Williams ................................. | 15/257.3 |
| 4,194,777 | 3/1980 | Carns . | |
| 4,210,351 | 7/1980 | Orofino .................................... | 294/1.5 |
| 4,225,174 | 9/1980 | Hennessy et al. ........................ | 294/1.4 |
| 4,262,948 | 4/1981 | Emme ..................................... | 294/1.5 |
| 4,368,907 | 1/1983 | Ross ........................................ | 294/1.4 |
| 4,555,132 | 11/1985 | Takoushian .............................. | 294/1.5 |
| 4,741,566 | 5/1988 | Byung-Do et al. ...................... | 294/1.4 |
| 5,039,148 | 8/1991 | Brautovich . | |
| 5,269,575 | 12/1993 | Parvaresh . | |

*Primary Examiner*—Dean J. Kramer
*Attorney, Agent, or Firm*—David L. Hoffman, Esq.; Cisco & Thomas LLP

[57] ABSTRACT

A dog waste receptacle device has a container with an opening at the top and bottom, a top cover and a bottom tray that each can be opened and closed freely, a latch for holding the bottom tray in a closed state, and a carrying rod whose lower end is attached to the side of the container. The top cover is hinged to the carrying rod in such a manner that it can be opened and closed freely. A trigger connected to the top cover for opening and closing it is mounted on the upper part of the carrying rod. A latching device capable of latching and unlatching the trigger is provided to hold the trigger in its position with the top cover open. A paper bag to accommodate dog droppings is placed inside the container. The top cover is closed under its own weight by releasing the trigger and the device is carried along by holding the carrying rod. As soon as the dog shows a motion of excreting, the top cover is opened and the container is placed under the dog's bottom. When returning from the walk, the bottom tray is released by pressing a knob with the tray positioned above a toilet, and the paper bag and its contents are readily disposed.

11 Claims, 3 Drawing Sheets

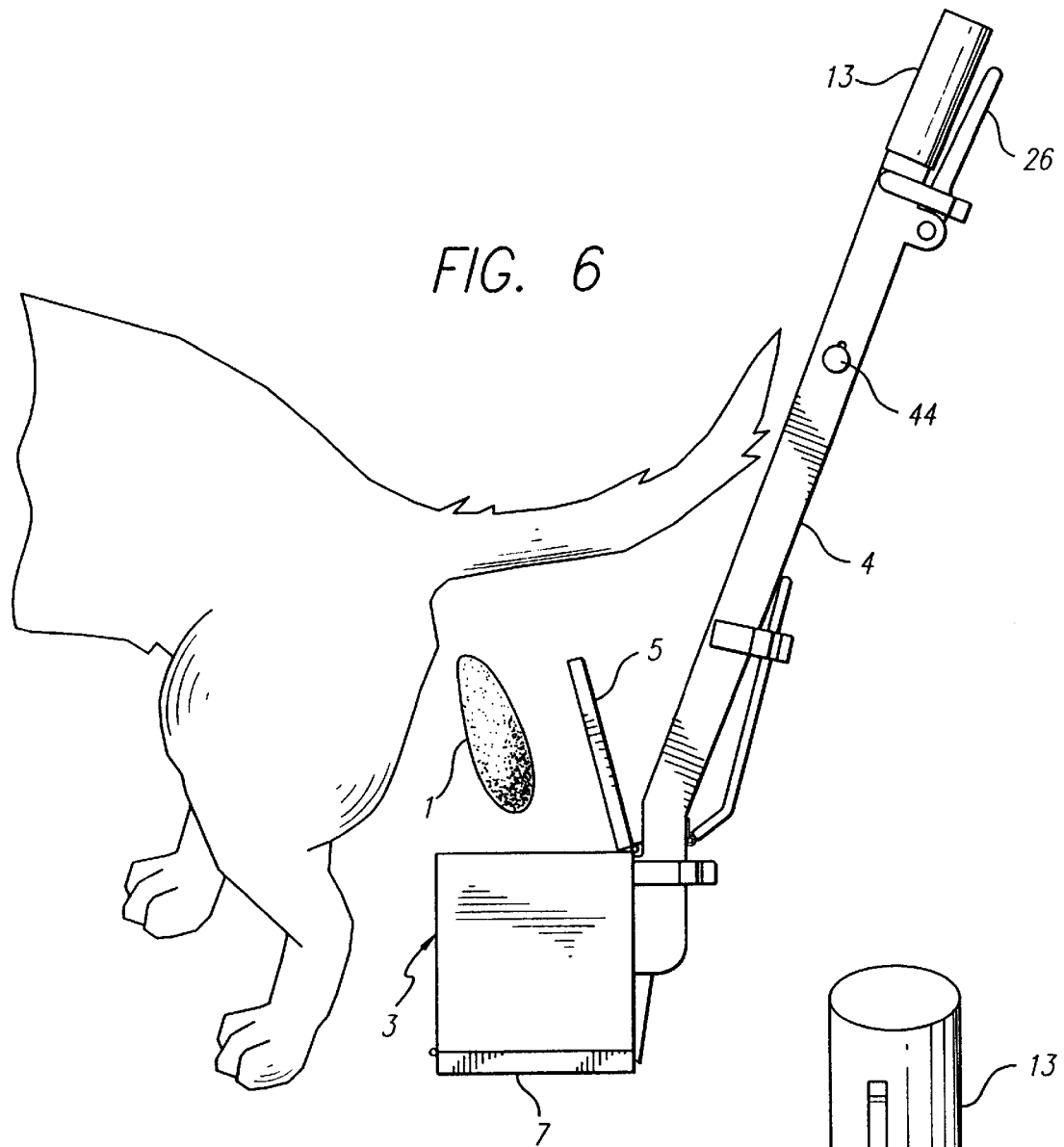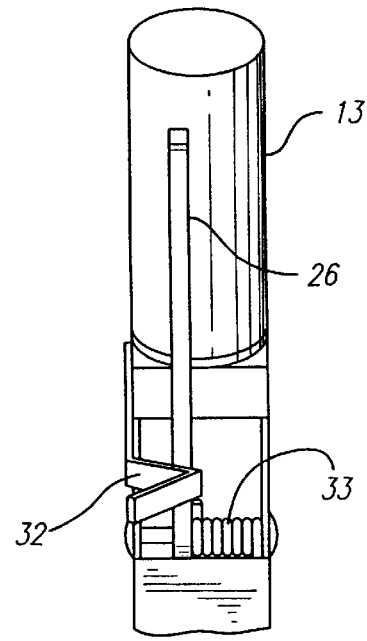

DOG WASTE RECEPTACLE AND DISPOSAL DEVICE

BACKGROUND OF THE INVENTION

The present invention relates to a portable dog waste receptacle and disposal device designed to collect and carry a dog's droppings excreted while walking the dog. It is capable of collecting the droppings during a walk without soiling the ground or lawn and without the unpleasantness of carrying it. It also offers an easy method of disposing of the droppings.

Dogs habitually excrete droppings while being walked. Since dogs are walked at public places such as parks or along rivers, if the droppings are not removed, the public will suffer from environmental pollution. It is the responsibility of the dog's owner to properly dispose the dog's droppings. In fact, many municipalities have laws specifically requiring dog owners to pick up the droppings.

Methods of disposing of a dog's droppings include scooping the droppings with a shovel and placing them in a bag, and inverting the bag and scooping droppings with the bag or other item into the inverted bag. The owner then brings the droppings home and disposes of them in a trash bin. Ordinarily, regular bags such as vinyl bags or plastic bags are used for this purpose. However, there are special bags designed to bring back the droppings. They include vinyl bags with deodorant placed inside, bags having bottoms that can be opened to dispose the droppings in the toilet, and bags spread out on the ground when a dog is about to excrete and collect it directly. These have been disclosed in Utility Model Registration Gazette No. 155756 (1989), Utility Model Registration Gazette No. 23855 (1993), and Utility Model Registration Gazette No. 30037 (1995).

It is difficult to completely pick up the droppings once deposited on the ground by the ordinary method of picking it up. There will be some remains left behind making it unclean, and the environmental pollution cannot be eliminated. Particularly, droppings deposited on grass are difficult to pick up cleanly. Consequently, many people just leave them. Additionally, after the droppings have been picked up, the bag containing them is normally held in one's hand. Therefore, there will be odor and other associated unpleasantness about it.

U.S. Pat. No. 5,269,575 to Paraders discloses a dog waste scoop and bag device which has a handle, a tray for holding an open plastic bag located at the bottom of the handle, and a rake to rake dog droppings into the bag. This still suffers from the problems of having to rake or pick up the droppings from the ground and having to handle the bag to close it or dispose of it.

What is needed is a device that prevents soiling of ground or grass by a dog's droppings, that enables one to carry the droppings without holding them in the hands, and that enables the collection of droppings without having to stoop down. In addition, what is needed is an easy way to bring the droppings home and dispose of them simply by dropping them into the toilet.

SUMMARY OF THE INVENTION

In one embodiment, the invention provides a container or receptacle with an opening at the top and bottom, a top cover and a bottom tray which each can be opened and closed freely, a latch for holding the bottom tray in a closed state, and a carrying rod whose lower end is attached to a side of the container. The top cover is hinged to the carrying rod in such a manner that it can be opened and closed freely. An opening and closing activating trigger connected to the top cover is mounted on an upper part of the carrying rod at a handle thereof. A latching device capable of latching and unlatching the trigger is provided to hold the trigger in its position to keep the top cover open. A paper bag or cup to accommodate the droppings is placed inside the container. The top cover is closed and the device is carried along by holding the carrying rod.

As soon as the dog shows a motion of excreting, the top cover is opened by squeezing the trigger and the container is placed under the dog's bottom. When returning from the walk, the bottom tray is opened above a toilet, and the paper bag and its contents are readily disposed.

BRIEF DESCRIPTION OF THE DRAWINGS

FIG. 6 is a schematic view showing the device in operation; and

FIG. 7 is an enlarged sectional view showing a latching mechanism for the trigger.

DETAILED DESCRIPTION OF THE INVENTION

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figures 1, 2:
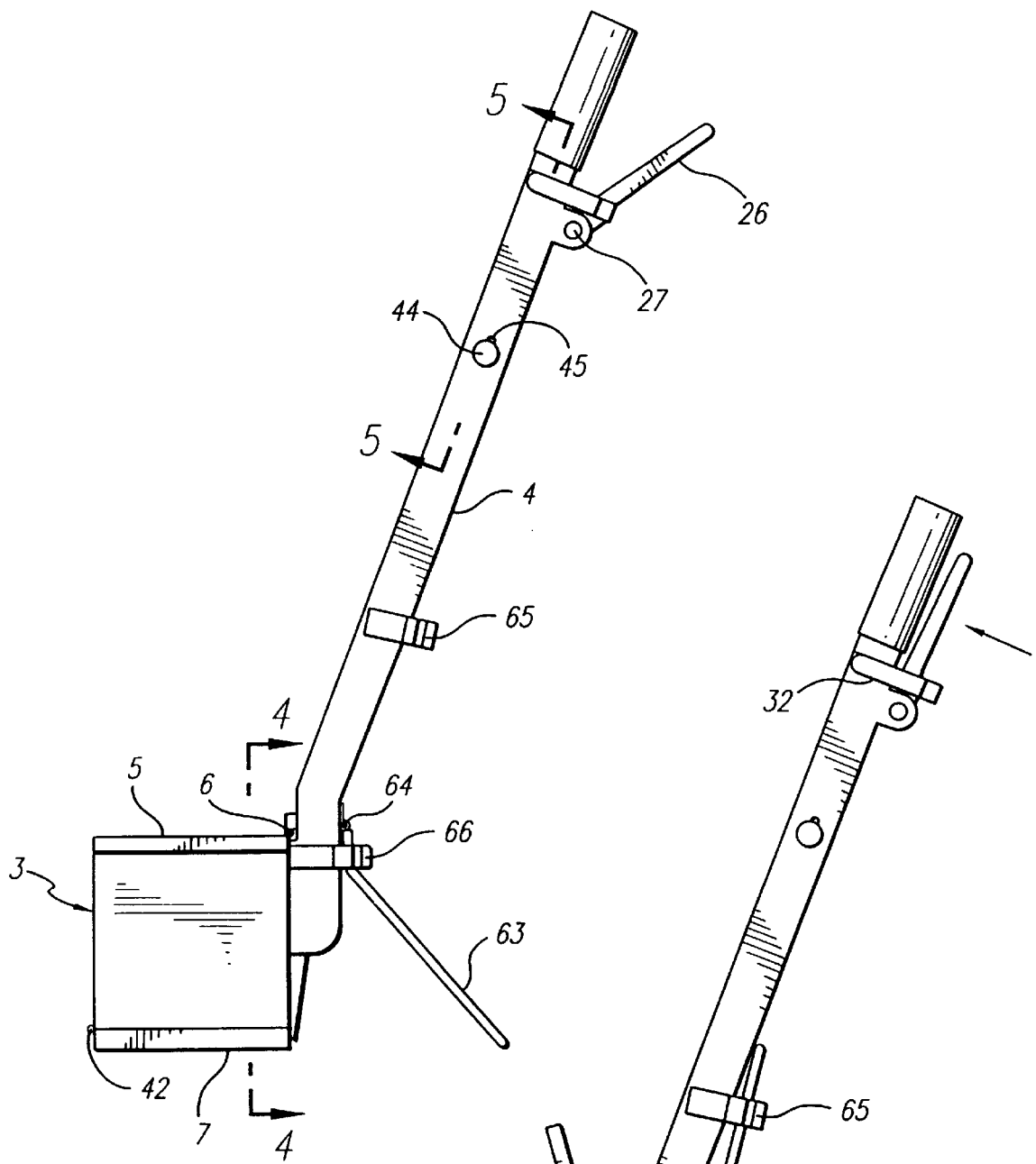
FIG. 1 is a side view of a dog waste receptacle device according to a first embodiment of the invention.
FIG. 2 is a view similar to FIG. 1 showing a top cover of the device in an open position and the handle trigger activated.

In a preferred embodiment, the dog waste receptacle device, as shown in FIG. 1, includes a container 3 with openings at the top and bottom, a top cover 5 and a bottom tray 7 that freely opens and closes the top and bottom openings, a latching mechanism that latches the bottom tray 7 in a closed position, and a holding rod 4 whose bottom is fixed, e.g. By screws, to the side of the container 3, and extends upward.

Figure 4:
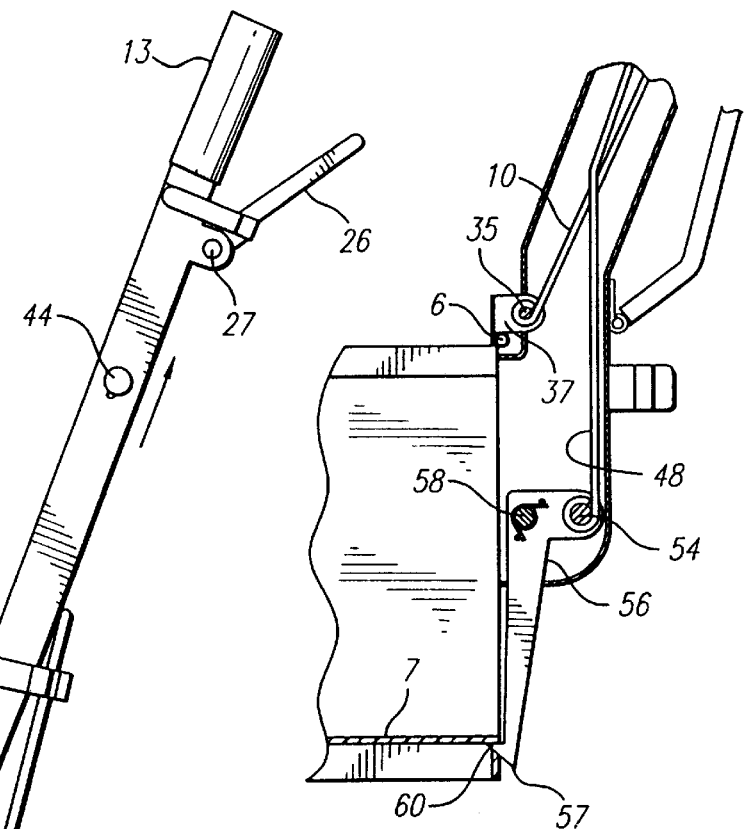
FIG. 4 is an enlarged and partial sectional view taken along a line 4—4 of FIG. 1 showing linkages and pivot devices for opening and closing the bottom tray and top cover.

The top cover 5 is hinged by a hinge 6 (FIG. 4) provided at a lower portion on the carrying rod 4 at the side of the container 3 in such a manner that it can be opened and closed freely. Squeezing trigger 26 opens the top cover 5. Trigger 26 is connected to the top cover 5 by means of a rod 10 or relatively rigid wire link mounted to the upper part of the carrying rod 4 at a handle 13. The trigger is rotatably mounted on a pin 27 fixed to a plate 28 mounted to or part of the rod 4. The trigger is in the form of a bent arm with a pin 29 fixed to one end. A rod 10 is fixed to the pin 29, e.g., by wrapping and/or solder. When the trigger is squeezed, the trigger's arm pivots counterclockwise about pin 27 moving rod 10 down. In turn, rod 10 is fixed at its lower end to a pin 35 by wrapping and/or solder that is fixed to a bracket 37 in turn connected to hinge pin 6 and cover 5. Thus, cover 5 rotates clockwise about 90° to open. The top cover 5 can be latched when the top cover 5 is opened by a latching device, e.g., a spring clip 32 (FIG. 7) that can be freely latched and unlatched. Releasing trigger 26 closes cover 5 by reverse operation. The weight of the cover must serve to naturally return it to the closed position. In addition, a torsion spring or springs may be connected to the pins 27, 29 and/or pin 35 to bias the cover to the closed position. Pins 27, 29 and 35 may be threaded. In fact, FIG. 7 shows a spring 33 to bias trigger 26 to the non activated position of FIG. 1.

Figure 3:
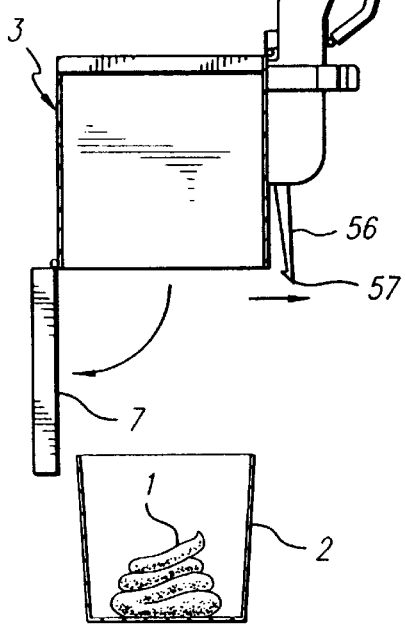
FIG. 3 is a side view similar to FIG. 1 showing a bottom tray in an open position and a knob in an up position.
Figure 5:
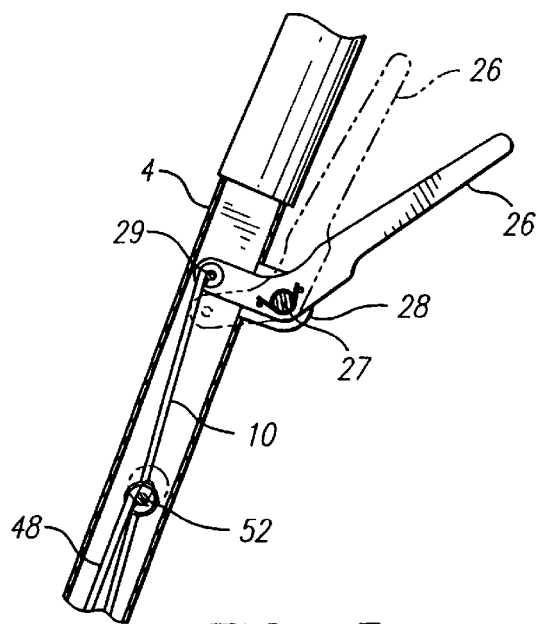
FIG. 5 is an enlargement and partial sectional view taken along a line 5—5 of FIG. 1 of an upper portion of the device showing additional aspects of the linkages and activating devices in accordance with the invention.

The bottom tray 7 is hinged to the container 3 through a hinge pin 42 having a horizontal axis in such a manner that it can be opened and closed freely. The bottom tray is opened and closed by means of a button or knob 44 connected to a latching device for the bottom tray using a rod 48 or relatively rigid wire linkage. The rod 48 is connected to an upper pin 52 at one end and a lower pin 54 at the other end by wrapping and/or soldering. The pins 52, 54 may be threaded. Pin 52 is connected to knob 44, by passing through a slot 45 in rod 4. Moving the knob 44 up, moves pin 52 up, pulls up on rod 48, and in turn pulls up on pin 54. Pin 54 is fixed to one end of a bent arm 56 which has an integral pawl or claw 57 at the other end, and which is pivotably mounted to a pin 58. The claw engages a free end in an opening 60 in the bottom tray 7 and holds it closed when the knob 44 is down, by gravity acting on the knob 44, rod 48, pin 54 and right side of the bent arm 56, and engagement of pawl 57 and tray opening 60. In addition to gravity, a torsion spring or springs may be connected to the pin 52 and/or pin 54 to bias the tray to the open position. When the pin is up, the bent arm rotates counterclockwise because the rod 48 pulls up on pin 54, thereby removing the pawl 57 from opening 60 and releasing tray 7 as shown in FIG. 3.

A method for using the portable receptacle for dogs of this invention is as follows. First, the bottom tray 7 is closed, and a paper bag 2 like a coffee filter is placed inside covering the surface of the bottom tray 7 and the container 3, before taking the dog for a walk. The paper bag 2 is preferably a water-soluble type or other type that can be disposed in the toilet. Preferably, a paper bag pre-formed to fit the bottom of cylindrical container should be used. Then, the top cover of the container 3 is closed and carried along to walk the dog. As soon as the dog shows a motion of excreting, the top cover 5 of the container 3 is opened by squeezing the trigger 26 and the container 3 positioned under the dog's bottom. Since the carrying rod 4 extends upward and at an angle from the side of the container 3, the container can be quickly inserted from behind the dog (FIG. 6). As soon as the dog finishes excreting, the top cover is closed by releasing the trigger, and the droppings 1 are carried along in the container which the user holds by the upper end of the carrying rod 4.

By latching the trigger 26 with the latching spring clip 32, the top cover 5 can be held in open position while collecting the droppings. Since the top cover opens towards the carrying rod 4, it does not get in the way when inserting it under the dog's bottom. When carrying the device, the top cover 5 remains closed by its own weight. In addition, the device may be supported by a stand 63 mounted on a pivot pin 64 and held in a use position as in FIG. 1 by a spring clip 66.

When not in use, the stand is pivoted to its up position where it is held by a spring clip 65 (FIG. 2).

Since a dog typically excretes two or three times during a walk, the operation described above can be repeated each time. Upon returning from the walk, the device is taken to the toilet, and the bottom tray 7 is opened by moving the knob 44 up to dispose of the paper bag 2 and its contents into the toilet (FIG. 3).

After the droppings are disposed in the toilet, the bottom cover 7 is closed and a new disposable paper bag 2 is placed in the container 3 for the next outing. The dog's droppings do not directly contact the container 3 or the bottom tray 7 due to the cup. Therefore, there is no need to wash the container each time it is used.

The container 3 or the top cover and bottom tray 5, 7 can be made of sheet metal. However, synthetic resin (plastic) is the preferred material as it avoids the need for painting and the problem of rusting, is lightweight, will not soil easily, and is easy to wash.

In addition, it is preferable to manufacture the device in a variety of sizes to be suitable for a variety of dogs.

While the present invention has been described with regards to particular embodiments, it is recognized that additional variations of the present invention may be devised without departing from the inventive concept.

What is claimed is:

1. A portable toilet for dogs comprising: a container with an opening at the top and bottom, a top cover and a bottom tray for the container that can be opened and closed freely, a latching means for holding the bottom tray in a closed position, and a carrying rod whose bottom end is fixed to one side of the container and extends upward, and further comprising means for hinging the bottom tray to the container in such a manner that it can be freely opened and closed about a horizontal axis at another side of the container remote from the one side and the carrying rod, and bottom tray release means, connected to the latching means for the bottom tray, for releasing this latching means.

2. The portable toilet of claim 1, further comprising means for hinging the top cover to a horizontal axis proximate the carrying rod to open and close, and means for opening and closing the top cover connected to the top cover and mounted on the upper part of the carrying rod.

3. The portable toilet of claim 2, further comprising a latching device for latching the means for opening the top cover in the opened position.

4. The portable toilet of claim 2 wherein the means for opening and closing the top cover comprises a rod and a trigger fixed to the rod proximate a free end of the carrying rod.

5. The portable toilet of claim 1 wherein the means for releasing comprises a rod and a button fixed to the rod.

6. The portable toilet of claim 1, wherein the latching means comprises a hook, and means for pivoting the hook to release the bottom tray for pivoting to an open position in response to gravity acting on the bottom tray.

7. A portable toilet for dogs comprising:
   a container with an opening at the top and bottom;
   a top cover and a bottom tray for the container that can be opened and closed freely;
   a latching means for holding the bottom tray in a closed position;
   a carrying rod whose bottom end is fixed to one side of the container and extends upward; and
   a stand pivotably connected to the rod for pivoting to a first position for contacting a support surface and located at an oblique angle for supporting the rod, and pivotably to a second position substantially parallel to the rod for storage, and further comprising means for hinging the bottom tray to the container in such a manner that it can be freely opened and closed about a horizontal axis at another side of the container remote from the one side and the carrying rod, and bottom tray release means, connected to the latching means for the bottom tray, for releasing this latching means.

8. The portable toilet of claim 7, further comprising first means for latching the stand in the first position and second means for latching the stand in the second position.

9. A portable toilet for dogs comprising:

a container with an opening at the top and bottom;

a top cover and a bottom tray for the container that can be opened and closed freely;

a latching means for holding the bottom tray in a closed position;

a carrying rod whose bottom end is fixed to one side of the container and extends upward; and means for hinging the top cover to a horizontal axis proximate the carrying rod to open and close, means for opening and closing the top cover connected to the top cover and mounted on the upper part of the carrying rod, and a latching device for latching the means for opening the top cover in the opened position, and further comprising means for hinging the bottom tray to the container in such a manner that it can be freely opened and closed about a horizontal axis at another side of the container remote from the one side and the carrying rod, and bottom tray release means, connected to the latching means for the bottom tray, for releasing this latching means.

10. The portable toilet of claim 9, wherein the rod extends from the one side of the container at an acute angle to the one side.

11. The portable toilet of claim 9, wherein the means for opening and closing the top cover comprises a linking rod and trigger proximate a free end of the carrying rod.

* * * * *